Nov. 24, 1942.　　　A. W. OEHLER　　　2,302,881
PICKUP DEVICE
Filed June 23, 1941　　　2 Sheets-Sheet 1

INVENTOR:
ALVIN W. OEHLER
BY
ATTORNEYS.

Nov. 24, 1942.　　A. W. OEHLER　　2,302,881
PICKUP DEVICE
Filed June 23, 1941　　2 Sheets-Sheet 2
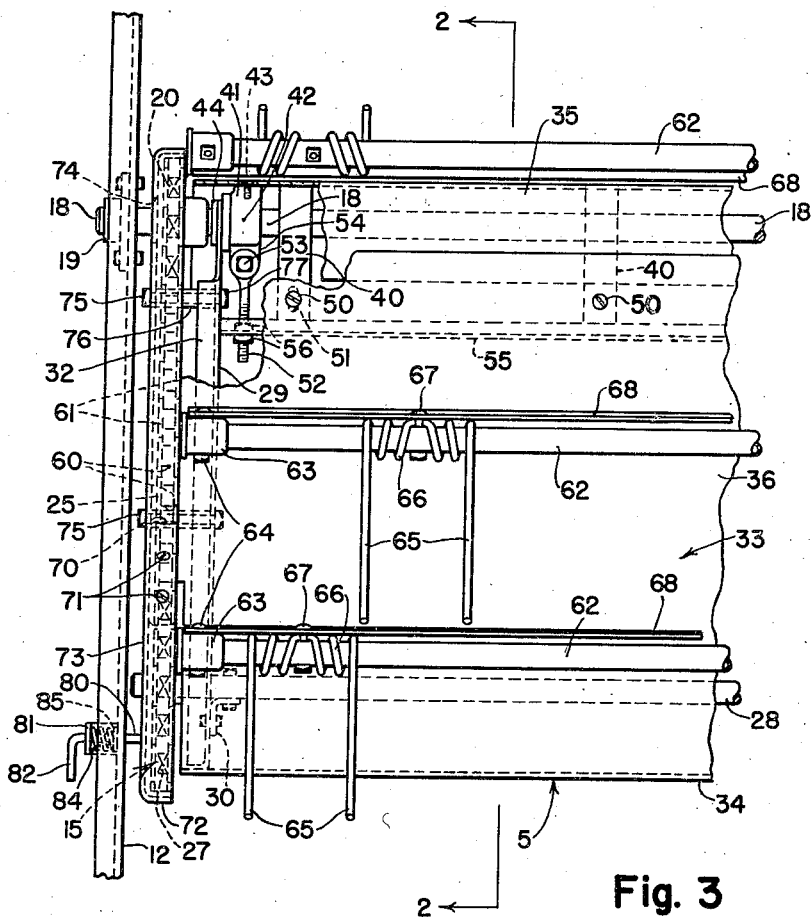
Fig. 3
INVENTOR:
ALVIN W. OEHLER
ATTORNEYS.

Patented Nov. 24, 1942

2,302,881

UNITED STATES PATENT OFFICE 2,302,881

PICKUP DEVICE

Alvin W. Oehler, Moline, Ill., assignor to Deere & Company, Moline, Ill., a corporation of Illinois Application June 23, 1941, Serial No. 399,363

4 Claims. (Cl. 56—364)

The present invention relates to pick-up devices of the type used on harvester platforms for picking up a windrowed crop from the field and depositing it on the harvester platform. The principal object of my invention relates to the provision of a pick-up device of novel design, which operates with greater efficiency than devices heretofore known to those skilled in the art, and yet is extremely simple and durable. More specifically, it is an object of the present invention to provide a pick-up device for handling windrowed grain and which is capable of picking up the grain and delivering it to the platform with a minimum loss of kernels. It is well-known to those skilled in the art that when ripe grain is harvested in this manner, having been allowed to dry in the field, the kernels are easily separated from the straw as the crop is being picked up, and many of the kernels are lost by dropping from the forward end of the pick-up device. Obviously, the higher the grain is raised before it is placed on the platform, the more chance there is of losing kernels. In an attempt to minimize the height to which the grain is raised, pick-up devices have been proposed which comprise short endless conveyors having pick-up fingers and having front rollers of comparatively small diameter, the conveyor being inclined upwardly and rearwardly to raise the crop to the platform. Although this type of conveyor does not initially raise the grain to an excessive height, difficulties have been encountered in certain grains due to the kernels sliding or rolling from the front edge of the pick-up device.

In the accomplishment of these objects, I have employed a forward roller over which the flexible endless conveyor type pick-up is trained, of slightly larger than minimum practicable diameter and have provided means for causing the conveyor to follow a path which curves downwardly and inwardly behind the forward roller so that the upper flight of the conveyor upon which the grain is carried is concave in form. The kernels of grain do not tend to slide forwardly out of the hollow behind the front rotary member, and furthermore each row of crop engaging fingers imparts a rearward tossing action to the grain as the row of fingers passes over the forward rotary member, as will be evident from the following description.

Figure 1:
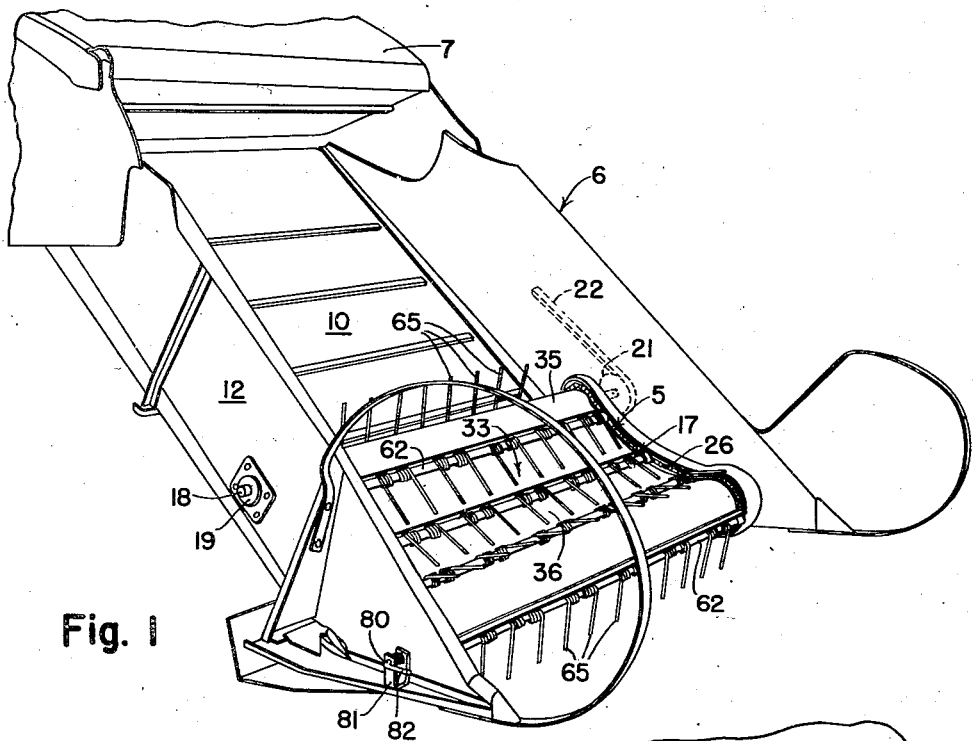
Figure 2:
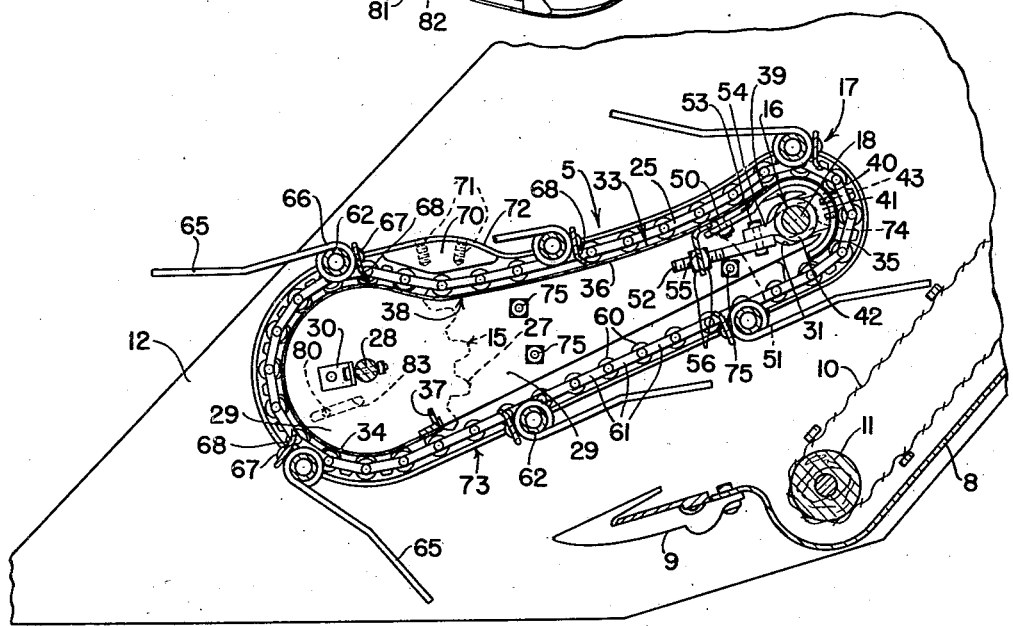

These and other objects and advantages of my invention will be apparent after a consideration of the following description in which reference is had to the drawings appended hereto, in which Figure 1 is a perspective view of a pick-up device embodying the principles of the present invention, shown mounted on the forward end of a harvester platform;

Figure 2 is a sectional elevational view of the pick-up device as viewed along a line 2—2 in Figure 3; and Figure 3 is a fragmentary plan view showing one end of the pick-up device, certain parts being broken away to more clearly show the details of construction.

Referring now to the drawings, the pick-up device, indicated generally by reference numeral 5, is mounted on the forward end of a harvester platform 6 pivotally mounted in a conventional manner on the forward end of the thresher body 7 of a combine of the straight-through type. The platform 6 comprises the usual bottom sheet 8 along the forward edge of which is mounted a conventional cutter bar 9, which is, of course, inoperative when the pick-up device is installed on the platform. The usual flexible endless canvas conveyor 10 is trained around the lower conveyor roller 11 and travels upwardly and rearwardly to deliver crop to the threshing cylinder (not shown). The platform 6 is also provided with a pair of laterally spaced generally vertical side walls 12, which also serve as supports for the pick-up device, as will now be explained.

The pick-up device comprises a front rotary member 15, a rear rotary member 16, and a flexible endless conveyor 17 trained around the front and rear rollers. The rear rotary member 16 comprises a drive shaft 18 journaled at opposite ends, respectively, in a pair of bearings 19 carried in the two side walls 12 and only one of which is visible in the drawings. Fixedly mounted at each end of the shaft 18 but inside the bearings 19 is a pair of sprockets 20, and the shaft 18 is driven by means of a sheave 21 mounted on the stubbleward end of the shaft 18 outside the platform sidewall 12. The sheave 21 is driven by means of a V-belt 22 connected to any suitable driving pulley on the thresher body, preferably mounted on the transverse axis of vertical swinging movement of the platform in the conventional manner.

Each of the sprockets 20 drives an endless chain 25, 26 disposed at opposite sides of the platform inside the side walls 12 thereof, respectively. The chains 25, 26 are trained over the front rotary member 15, which comprises a pair of laterally spaced sprockets 27, journaled for rotation at opposite ends of a fixed shaft 28. The shaft 28 is fixed at opposite ends thereof to a pair of end plates 29 by means of angle clips 30 bolted to the shaft 28 and plates 29. The rear ends of the end plates 29 are provided with slots 31 through which the shaft 18 extends, thus supporting the plates 29 from the shaft 18. The edge of each of the end plates 29 is turned outwardly to provide a flange 32, which supports an apron 33 extending laterally between the two chains 25, 26. The forward end of the apron 33 is curved about the axis of rotation of the forward rotary member 15, as indicated at 34, while the rear end of the apron 35 is curved about the axis of the rear rotary member 16. The apron 33 is made in two parts, the forward portion including the curved end 34 and the intermediate portion 36 between the two rotary members, which is curved downwardly and inwardly at 38 behind the front rotary member 15 toward the common plane of the axes of the two rotary members. From this point rearwardly the apron curves upwardly and is concave in form. The rear curved portion 35 of the apron is in a separate piece which is overlapped by the rear edge 39 of the front portion and is supported on a number of curved strap members 40 disposed inside of the curved portion 35 and extending forwardly beyond the forward edge of the portion 35. The portion 35 is supported on bosses 41 formed integrally with a pair of laterally spaced bearing blocks 42 which are journaled on the shaft 18. A pair of countersunk screws 43 are provided for rigidly attaching the apron portion 35 to the bosses 41. Each of the bearing blocks 42 is also provided with an axially extending hub portion 44 adapted to receive the slot 31 in the end plate 29.

The forward end of each of the straps 40 is secured to the apron 33 by a bolt 50, the head of which is countersunk flush with the surface of the apron 33. The bolts 50 extend through slots 51 in the strap members 40 to accommodate movement of the upper curved portion 35 relative to the intermediate portion 36 of the apron, with the shaft 18 is shifted to tighten the chain 25, which is accomplished by means of an eye bolt 52 connected by a bolt 53 to a lug 54 formed integrally with the bearing block 42. The eye bolt 52 extends forwardly through a suitable aperture in a transversely extending angle member 55, which is welded or otherwise secured to the intermediate portion 36 of the apron 33 and the end plates 29. A pair of nuts 56 are threaded on the eye bolt 52 on opposite sides of the angle member 55 for securing the shaft 18 in adjusted position with respect to the side plates 29. Inasmuch as the shaft 18 is mounted in fixed relation to the platform side walls 12 in the journal bearings 19, it is evident that adjusting the nuts 56 will shift the lower shaft 28 forwardly or rearwardly with respect to the upper shaft 18. This adjustment must be made with the bolts 50 loosened to permit them to shift within the slots 51. When the tension of the chain 25 is adjusted to the correct amount, the nuts 56 are tightened in place and also the bolts 50.

Each of the chains 25 is composed of a series of rollers 60 interconnected by links 61 along opposite ends of the rollers. The two chains 25, 26 are interconnected by transversely extending bars 62, each of the bars 62 having a supporting socket 63 at each end thereof and fixed thereto by a bolt 64. Each of the socket members 63 is rigidly attached, as by welding, to one of the links 61. A plurality of laterally spaced crop engaging teeth 65 is mounted on each of the transverse bars 62. The teeth 65 are made in pairs, interconnected by a coil 66 serving as a spring to permit the teeth to yield when they encounter the ground or any rigid obstruction. Each tooth supporting coil 66 encircles the associated bar 62 and is fixed thereto by means of a bolt 67.

A transversely extending wiping member 68 extends along each of the bars 62 along the leading side thereof and is secured to the latter by means of the bolts 64, 67. The wiping member is preferably made of flexible material such as felt or leather and the edge of the wiper scrapes along the sheet metal apron 33 and scrapes the kernels of grain rearwardly over the apron to deposit the latter upon the platform canvas 10 of the harvesting machine.

The fingers 65 are mounted on the bars 62 in such a manner that they are generally parallel to the chain 25 when the latter is straight, and extend in a trailing direction as the chain passes forwardly under the pick-up device and rearwardly over the apron 33. As each bar 62 passes around the forward end of the curved portion 34, the fingers 65 are substantially tangent to the path of movement of the chain and consequently the ends of the teeth 65 engage the crop lying on the ground and raise the latter up over the curved portion of the apron. At this point the chains 25, 26 are wrapped around the sprockets 27, but instead of the chains extending tangentially from the forward sprocket 27 to the rear sprocket 20, they are guided in a path which curves downwardly and inwardly behind the forward sprocket 27, by means of a cam 70, disposed in engagement with the upper side of each of the roller chains directly above the inwardly curved portion 38 of the apron 33. Each of the cams 70 is fixed by bolts 71 to the axially extending flange portion 72 of a chain guard 73 which also serves as a track for the chain. Each of the chain guards 73 is apertured to receive the forward shaft 28 and is provided with an elongated aperture 74 through which the drive shaft 18 extends, thus providing for shifting the chain guards 73 longitudinally with the forward sprockets 27 when the chain is tightened. Each of the chain guards 73 is fixed to the end plate member 29 associated therewith, by means of bolts 75 which are embraced by spacing sleeves 76 for spacing the chain guards 73 with respect to the end plate 29, and a suitable nut 77 is provided on the inner side of the end plate 29 to receive the bolt 75.

The entire pick-up device is swingable vertically about the shaft 18, but normally during operation the forward end is supported at each side of the platform by means of a pin 80 which is supported in a pair of aligned apertures in a U-shaped bracket 81 fixed to the side wall 12 of the platform. The pin 80 is provided with a handle portion 82 by means of which the pin may be withdrawn from engagement with a slot 83 in the side of the chain guard 73. A spring 84 encircles the pin 80 between the two legs of the U-shaped bracket 81 and bears against a collar 85 fixed to the pin and thus urges the pin 80 inwardly into the slot 83. This slot extends longitudinally of the chain guard to permit the latter to be shifted when the chain is tightened. After the pin 80 on each side wall of the platform is withdrawn from the slot 83 the forward end of the pick-up device may be lifted for purposes of inspection or repair.

Reviewing the operation of the pick-up device, the conveyor is driven by the drive belt 22, which engages the pulley 21 and rotates the drive shaft 18 to which the sprockets 20 are attached, in a direction to cause the upper flight of the conveyor to move rearwardly and upwardly across the apron 33, thus causing the harvested crop to be carried rearwardly and deposited upon the harvester platform 10. As the fingers 65 pass around the axis of the drive shaft 18, the trailing ends of the fingers are raised in a position substantially tangent to the arcuate path of movement and thus impart a tossing action to the straw, throwing the latter upwardly upon the canvas 10. As the teeth move forwardly beneath the apron 33, they are again substantially parallel to the path of the chain and are thus withdrawn longitudinally from the crop upon the canvas 10. As the teeth approach the forward end of the pick-up device they are swung downwardly and forwardly into engagement with the crop upon the ground, lifting the latter up over the forward curved end 34 of the apron 33, and then by virtue of the concave shape of the intermediate portion 36 of the apron 33 and the inward curvature to the track of the chain guard 73, the outer ends of the teeth are swung upwardly, thus imparting a tossing action tending to throw the harvested crop rearwardly upon the apron 33. Each of the camming members 70 bears upon the top of the associated chain and thus tends to hold the transverse bars 62 and wiper members 68 against the concave portion of the apron and thus prevents any grain from sliding downwardly and forwardly over the forward end of the pick-up device.

I do not intend my invention to be limited to the exact details shown and described herein except as set forth in the claims which follow.

I claim:

1. A pick-up device comprising front and rear transversely disposed rotary members, a conveyor comprising a plurality of transverse bars connected together by means of a pair of flexible endless members disposed at opposite ends thereof, respectively, each of said flexible members being trained over said upper and lower rotary members, a relatively stationary apron extending between the latter, said apron being curved at its front and rear ends to embrace said rotary members and curved concavely between said rotary members to restrain harvested material from sliding forwardly therefrom, means for driving said conveyor rearwardly over said apron, and guide means for holding said conveyor bars in wiping engagement against the apron for scraping harvested material thereupon.

2. A pick-up device comprising front and rear rotary members supported for rotation about transversely disposed axes and including sprockets at opposite ends of each of said members, an endless chain trained around the front and rear sprockets at each end of said members, a plurality of transverse bars fixed at opposite ends thereof to said chains, respectively, crop engaging fingers attached to said bars, a relatively stationary apron extending between said rotary members and substantially coextensive with said bars, said apron being curved at its front and rear ends to embrace said rotary members and curved concavely between said rotary members to restrain harvested material from sliding forwardly therefrom, means for driving said conveyor rearwardly over said apron, and guide means for holding said conveyor bars in wiping engagement against the apron to scrape harvested material rearwardly thereon.

3. A pick-up device comprising front and rear rotary members supported for rotation about transversely disposed axes and including sprockets at opposite ends of opposite ends of each of said members, a flexible conveyor comprising an endless chain trained around the front and rear sprockets at each end of said members, rollers journaled on each chain in longitudinally spaced relation, and a plurality of spaced transverse bars fixed at opposite ends thereof to said chains, respectively, track means for supporting each of said chains and adapted to receive said rollers, a relatively stationary apron extending between said track means, said apron being curved at its front and rear ends to embrace said rotary members and curved concavely between said rotary members to retrain harvested material from sliding forwardly therefrom, wiping members extending along said bars and fixed thereto, means for driving said conveyor rearwardly over said apron, and camming means engaging the tops of said rollers for holding said bars in wiping engagement against said apron.

4. A pick-up device comprising front and rear rotary members supported for rotation about transversely disposed axes and including sprockets at opposite ends of each of said members, a flexible conveyor comprising an endless chain trained around the front and rear sprockets at each end of said members, rollers journaled on said chain in spaced relation, a track for supporting each of said chains and adapted to receive said rollers and including a flange extending over the top of said rollers, a plurality of transverse bars fixed at opposite ends thereof to said chains, respectively, a plurality of crop engaging fingers attached to said bars and extending generally parallel to the plane of said chains, a relatively stationary apron extending between the latter and having front and rear ends curved around said rotary members, the intermediate portion of said apron being concave between said rotary members, a camming block attached to each of said tracks under said flange adjacent said intermediate portion of said apron and adapted to bear upon the tops of said rollers for holding said bars in wiping engagement against said concave portion, and driving means for moving said conveyor rearwardly over said apron.

ALVIN W. OEHLER.

CERTIFICATE OF CORRECTION.

Patent No. 2,302,881.　　　　　　　　　　　　　　November 24, 1942.

ALVIN W. OEHLER.

It is hereby certified that error appears in the printed specification of the above numbered patent requiring correction as follows: Page 3, second column, line 18, claim 3, strike out "of opposite ends"; line 31, same claim, for "retrain" read --restrain--; and that the said Letters Patent should be read with this correction therein that the same may conform to the record of the case in the Patent Office.

Signed and sealed this 29th day of December, A. D. 1942.

(Seal)　　　　　　　　　　　　　　　　　　　　Henry Van Arsdale,
　　　　　　　　　　　　　　　　　　　　　Acting Commissioner of Patents.